No. 676,894. Patented June 25, 1901.
J. C. HIGGINS.
SOFT TREAD HORSESHOE.
(Application filed Jan. 21, 1901.)
(No Model.)

Witnesses:
Raphaël Netter
C. D. Morrill

Joseph C. Higgins, Inventor by Kerr, Page & Cooper Attys.

UNITED STATES PATENT OFFICE.

JOSEPH C. HIGGINS, OF BOUNDBROOK, NEW JERSEY.

SOFT-TREAD HORSESHOE.

SPECIFICATION forming part of Letters Patent No. 676,894, dated June 25, 1901.

Application filed January 21, 1901. Serial No. 44,094. (No model.)

*To all whom it may concern:*

Be it known that I, JOSEPH C. HIGGINS, of Boundbrook, in the county of Somerset, State of New Jersey, have invented certain new and useful Improvements in Soft-Tread Horseshoes, of which the following is a full, clear, and exact description, reference being had to the drawings accompanying and forming a part of this specification.

My present invention relates to cushioned horseshoes—*i. e.*, those provided with tread portions formed of rubber or similar material, and it is particularly designed to provide a durable and efficient rubber tread capable of ready and secure attachment or easy of replacement.

Figure 1:
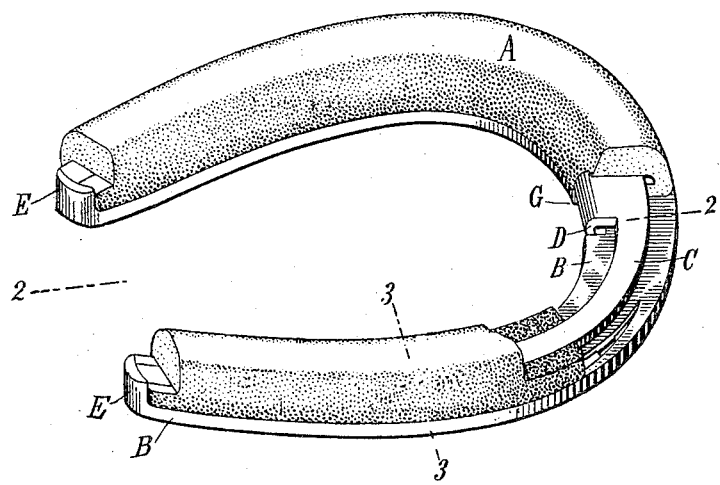
Figure 2:
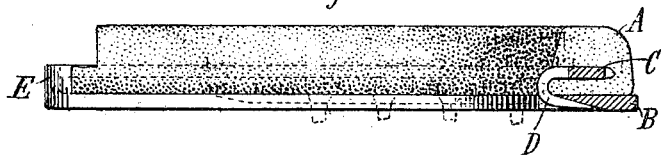
Figure 3:
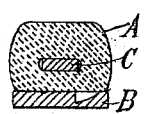
Figure 4:
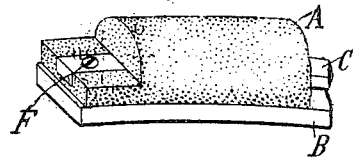

In the drawings, Figure 1 shows my invention in perspective, partly broken away. Fig. 2 is a sectional view on the line 2 2 of Fig. 1. Fig. 3 is a section on the line 3 3 of Fig. 1. Fig. 4 is a detail of a mode of fastening at the heels.

A is a pad or cushion formed of rubber or other suitable material. This may, as shown in the drawings, follow substantially the contour of the metal shoe B. In the rubber I insert or embed a metal strip C, running longitudinally of the cushion. The pad A is preferably provided with a channel or passage for the strip C. At a point which may be midway of the length of the strip C or at other suitable place I provide a clip or band D, capable of holding in firm engagement with each other the strip or retainer C and the metal shoe B. It is immaterial whether this clip D is made integral with the shoe or with the strip or independent of both. If it be a part of the retainer C, I have found it desirable to make the pad A in two parts, so that the halves may be pulled on the retainer from the opposite ends, thus avoiding the necessity of forcing the clip D through the passage in the rubber.

At the rear ends or heels of the horseshoe I form calks E E, against which the ends of the retainer C abut firmly when the cushion-tread A is in place. If preferred, the calks E may be dispensed with and the ends of the retainer C fastened to the body of the metal shoe B, as by screws F, Fig. 4.

It will be understood that in the construction shown in Figs. 1 to 3 the pad is fastened to the shoe by bending the toe-clip D tightly down over the metal shoe B, a recess or offset G being let into the metal shoe, if desired, into which the clip D may fit securely. Care should be taken when the clip is being fastened to have the pad properly in place on the shoe, the ends of the retainer C pressed firmly against the heel-calks E. Replacement is equally easy, the entire cushion being capable of both application and removal without removing the shoe from the horse's hoof.

In the construction illustrated in Fig. 4 the ends of the retainer C may be fastened down before the clip D is secured in place.

While I have shown the cushion-pad as substantially following the contour of the metal shoe, it is not material that it should do so, as the shape of either or both may be varied widely without departing from my invention. The retainer C may be a single metal strip or wire, as shown, although any other equivalent means, as a plurality of wires, &c., may be substituted. The clip D is likewise typical only and capable of variation in form and location. I prefer to have it located at or near the middle of the arch of the shoe.

What I claim as my invention is—

1. In a cushioned horseshoe, the combination of a metal shoe having its under surface recessed near its middle portion, a cushioned tread seated upon the said metal shoe, a metal retainer embedded in the tread substantially throughout its length, means for securing the rear ends of the cushioned tread to the shoe, and a clip secured to substantially the middle portion of the retainer having its outer or free end binding over the edge of the metal shoe and lying in the said recess, substantially as set forth.

2. In a cushioned horseshoe, the combination of a metal shoe having its under surface recessed at G near its middle portion, a cushioned tread made in two parts arranged to be seated upon the metal shoe, a metal retainer C to the middle of which is secured a clip D, which is bent over the edge of the shoe and has its free end lying in the recess G, the end portions of the retainer on each side of the clip being passed through the parts of the tread, and means for securing the outer ends of the tread to the shoe, substantially as set forth.

JOSEPH C. HIGGINS.

Witnesses:
HENRY BONHAM,
DAVID O. CONE.